United States Patent [19]

Tanaka et al.

[11] 4,108,364

[45] Aug. 22, 1978

[54] APPARATUS FOR PROCESSING BETTING TICKETS

[75] Inventors: Takehiko Tanaka, Kawasaki; Yuzo Wakatsuki, Tokyo; Toshio Niiya, Fuchu, all of Japan

[73] Assignees: Fujitsu Limited; The Japan Racing Association, both of Japan

[21] Appl. No.: 725,181

[22] Filed: Sep. 21, 1976

[30] Foreign Application Priority Data

Sep. 23, 1975 [JP] Japan ............................... 50-115271

[51] Int. Cl.[2] ............................................ G06K 5/00

[52] U.S. Cl. ................................................ 235/419

[58] Field of Search .................... 235/61.7 R, 61.7 B, 235/61.9 R; 340/149 A, 149 R

[56] References Cited

U.S. PATENT DOCUMENTS

| | | | |
|---|---|---|---|
| 3,862,716 | 1/1975 | Black et al. | 235/61.7 B |
| 3,996,450 | 12/1976 | Kerkhoff | 235/61.7 B |
| 4,016,405 | 4/1977 | McCune et al. | 235/61.7 B |
| 4,023,012 | 5/1977 | Ano et al. | 235/61.7 B |

*Primary Examiner*—Daryl W. Cook
*Attorney, Agent, or Firm*—Staas & Halsey

[57] ABSTRACT

Herein disclosed is an apparatus for processing betting tickets which prints the betting tickets with at least one attached secret code and verifies said betting tickets during payment of dividends. According to the present invention, the secret code is formed logically in accordance with the input betting information received from the clients, said secret code is added to the betting information and recorded on said betting tickets. During payment of said dividends with respect to the betting ticket, said secret code on the betting tickets is verified as to whether said secret code coincides with another code which is formed logically in accordance with the betting information on said betting ticket, for verifying the payment of said dividends. If said codes do not coincide, then said ticket is considered to be a falsified or forged one.

7 Claims, 6 Drawing Figures

(a)

(b)

APPARATUS FOR PROCESSING BETTING TICKETS

The present invention relates to an apparatus for processing betting tickets. Said apparatus prints the betting tickets which contain at least one secret code and verifies said betting tickets during payment of dividends.

In gambling, such as at horse races, bicycle races, and auto races, spectators can buy betting tickets while attending such races. Profits can be gained if the numbers on the betting tickets match the winning results of the races. On the conventional betting tickets, information recorded on each ticket were called "Forecast numbers" that is, the frame numbers of the first and second place horses in the race, such as "3-4", and the unit price, such as "1000 Yen", of the betting ticket. As the unit price of said ticket was predetermined, when spectators wished to double or triple their bet on the same betting ticket, they were required to buy a multiple number of the same type of betting ticket. For eliminating the above-mentioned superfluous procedure, variable unit tickets are being used. That is, the price which is recorded on the ticket can be changed. Therefore, one ticket wherein the unit price is recorded as "2000 Yen" corresponds to two tickets wherein the unit price is recorded as "1000 Yen".

However, such conventional betting tickets or unit betting tickets were required to be bought before every race due to the constantly changing forecast numbers. As an outcome of this requirement, ticket offices were crowded at all times with spectators who were buying such tickets. Thus, for alleviating congestions and confusions, many more offices had to be provided.

For completely removing the above-mentioned problem of congestion and confusion at the ticket offices, the same applicant invented the multi-betting ticket with which the spectator could carry multiple bets at the same time. On said multi-betting ticket, the information concerning, for example, the race numbers, the number of the winning horse W(Win), the placing of the first two horses P (Place) or the forecasting of the race F (Forcast), the betting number, and the number of the unit of the bet are disclosed. By using such multi-betting ticket, operations of the ticket office could be considerably simplified and the confusion at the ticket windows could be tremendously relieved.

However, as the prices of the above-mentioned unit tickets or multi-betting tickets are quite high in many cases, these tickets are often falsified or forged. When the falsified or forged tickets are used to gain dividends, a large problem of the misuse of tickets is created. For the purpose of removing the above-mentioned problem special printing methods or a special perforation method for inserting the betting information onto the betting tickets is conventionally used. However, such methods cannot completely prevent the falsification or the forgery of tickets.

The object of the present invention is to create a betting ticket processing apparatus which can provide the means for preventing the falsification or the forgery of tickets.

For achieving the above-mentioned object, the characteristic features of the present invention are the logical forming of a secret code in accordance with the input betting information received from the clients, the adding of said secret code to the betting information when betting ticket is printed, and the verifying of said secret code on said betting ticket, when dividends are paid with respect to the winning betting ticket, so as to check whether said secret code coincides with another code formed logically in accordance with the betting information on said betting ticket.

Further features and advantages of the present invention will be apparent from the ensuing description with reference to the accompanying drawings to which, however, the scope of the invention is in no way limited.

FIGS. 1(*a*) and 1(*b*) show one example of the multi-betting ticket according to the present invention;

Figure 1:
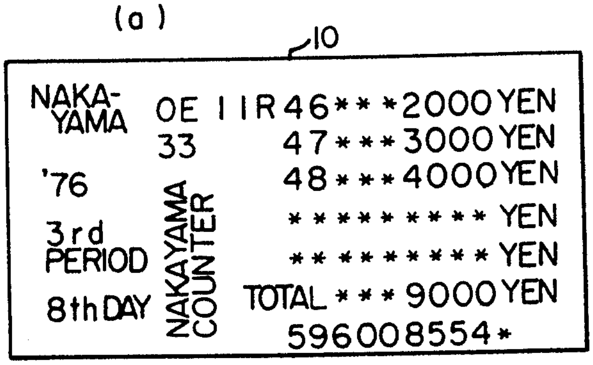
Figure 1:
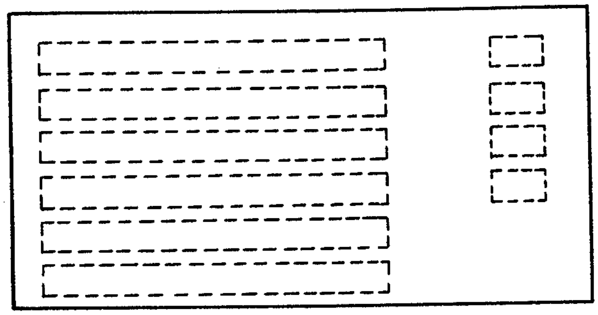

Referring to (a) of FIG. 1, the multi-betting ticket 10 according to the present invention includes the following sample information: the name of the race course "NAKAYAMA", the date: "1976", "3RD PERIOD", "8TH DAY"; the printing machine number "OE33"; the name of the printing office "NAKAYAMA COUNTER"; the race number "11R"; the betting numbers: 4-6, 4-7, 4-8; the multi-betting amounts: "2,000", "3,000", "4,000" Yen; the total sum of 9,000 Yen; the secret code "596" according to the present invention; and the code number "008554". The betting ticket 10 shown in FIG. 1 relates to the 11th race of the 8th day of the 3rd period, 1976 at the Nakayama Race Course and includes the betting information of three betting numbers and of a total of 9,000 Yen. This betting ticket 10 corresponds to 9 pieces of conventional betting tickets. In the multi-betting ticket shown in (a) of FIG. 1, the betting amount on the ticket is quite small. However, in actual cases, five betting numbers and 500,000 Yen, at the maximum, can be betted by using one multi-betting ticket. Therefore, according to the utilization of this efficient multi-betting ticket, confusion at the ticket windows caused by the too frequent purchases of single betting tickets can be considerably relieved.

Item (b) of FIG. 1 shows the magnetic recording region which is provided on the reverse side of the ticket shown in (a) of FIG. 1. In said magnetic recording region, the same information as that shown in (a) of FIG. 1 is coded and magnetically recorded. Actually, the information magnetically recorded on the reverse side of the multi-betting ticket cannot be seen by human eyes; therefore, we have showed said magnetically recorded region with the dotted lines as shown in FIG. 1.

The reasons for recording the betting information on the reverse side of the muti-betting ticket so as to be readable by mechanical means are shown below.

(1) According to the unit tickets, since the betting amount recorded on one ticket is variable, it is required to calculate the dividends for the unit ticket, even though the dividends are known with respect to 1000 Yen. This requirement results in an increase of the work load for the clerk in charge.

(2) According to the multi-betting ticket, since all of the multi-betting information is recorded, it is required to refer all betting information on the ticket to the dividends table for the purpose of examining whether a "hit" has occurred and thus to compute the dividends thereof. These requirements result in an increase of the work load for the clerk in charge.

Therefore, in order to decrease the work load of the clerk, it is necessary to automatically process the above-mentioned requirements. Accordingly, the betting information is recorded on the reverse side of the ticket so as to be able to be read by mechanical means.

The betting ticket according to the present invention is provided with magnetic recording regions. The processing apparatus for the betting tickets is provided with a magnetic recording and reading device, and the secret codes are recorded and read visually and/or mechanically, so that misuse of the betting ticket can be prevented.

Figure 2:
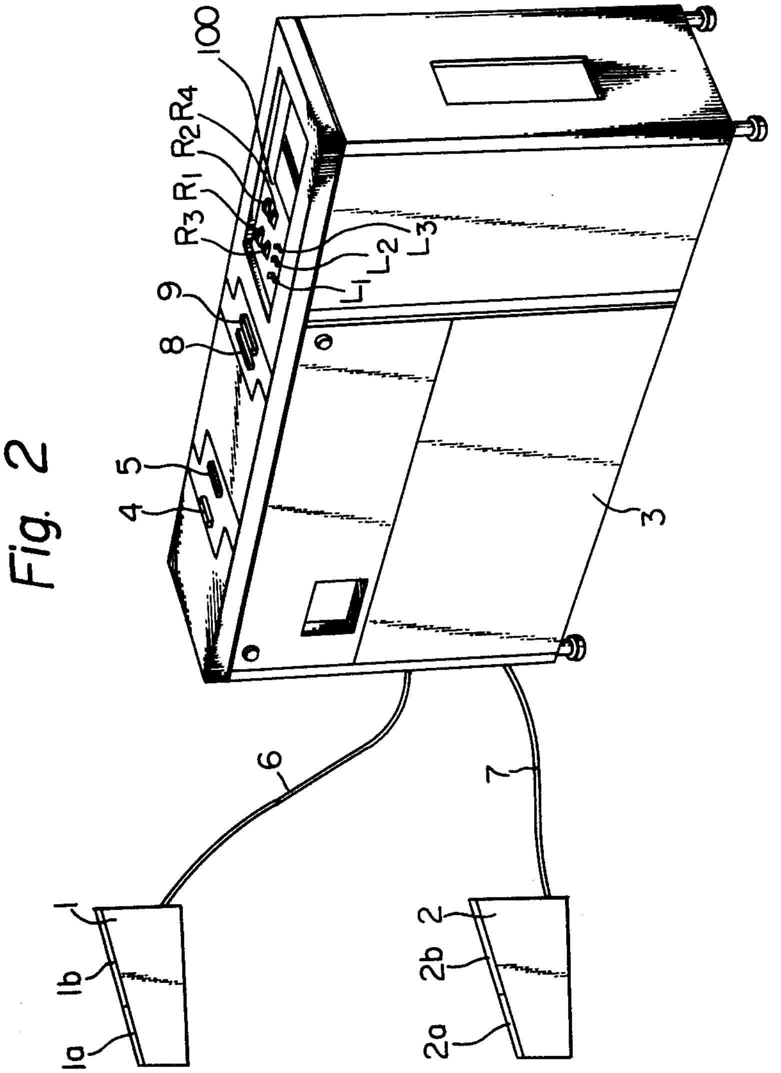
FIG. 2 shows an external view of one example of an apparatus used for selling betting tickets according to the present invention.

Referring to FIG. 2, the apparatus for processing the multi-betting ticket comprises input devices 1 and 2 through which the operator inputs the betting information and a main body 3. As we will explain hereinafter, the two input devices have the same construction and are connected by cables 6 and 7, respectively, to the main body 3 commonly provided with respect to the two input devices 1 and 2. The main body is provided with openings 4 and 5 for producing the output of the printed betting tickets. These openings are provided for two operators, each positioned on one side of the main body 3. The main body 3 also is provided with inserting openings 8 and 9 for inserting the betting ticket on which dividends are to be paid; with an operating panel 100 which is provided with rotary switches $R_1$ through $R_4$ for setting the semi-fixed information such as "Time", "Name of the race course", "Date", "Year"; and with alarm lamps $L_1$ through $L_3$ which light up when the magnetic read or write is not operating correctly, when the paper feed is finished, or when paper jam occurs.

Figure 3:
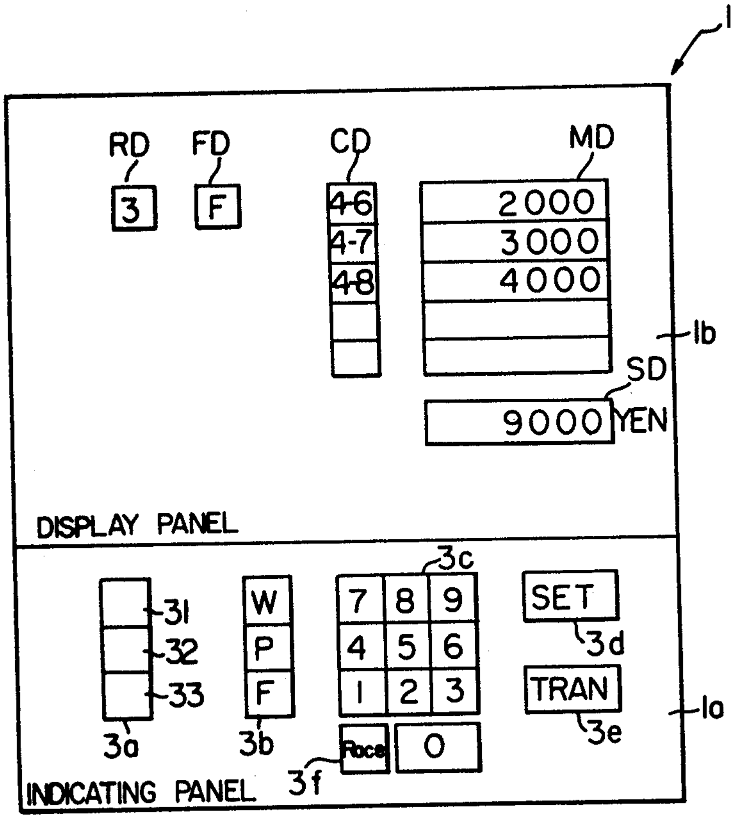
FIG. 3 shows an operating panel of the apparatus shown in FIG. 2.

Referring to FIG. 3, the operating panel in the input devices 1 and 2 includes an indicating panel 1*a* and a display panel 1*b*. The display panel 1*b* includes a race number display RD for displaying the race number, a betting information display FD, a betting number indicator CD, an amount (Unit number) display MD, and a total amount display SD for displaying the total amount of the indicator MD. The indicating panel 1*a* is composed of a keyboard which includes a group of mode input keys 3*a*: that is, a betting key 31 operated when the betting ticket is sold, a subtracting key 32 operated when the partial information on the ticket is corrected, a repaying key operated when the repayment is carried out; a group of betting keys 3*b*; that is, three keys 3*b* which are indicated by letters W(Win), P(Place) and F(Forecast); a group of keys 3*c* composed of ten keys 0 through 9 for typing the race numbers, the betting numbers and the total amounts, a set key 3*d*, a transmission key 3*e* and a race number input key 3*f* for inputting and changing the race numbers by operating the ten keys 3*c*.

Figure 4:
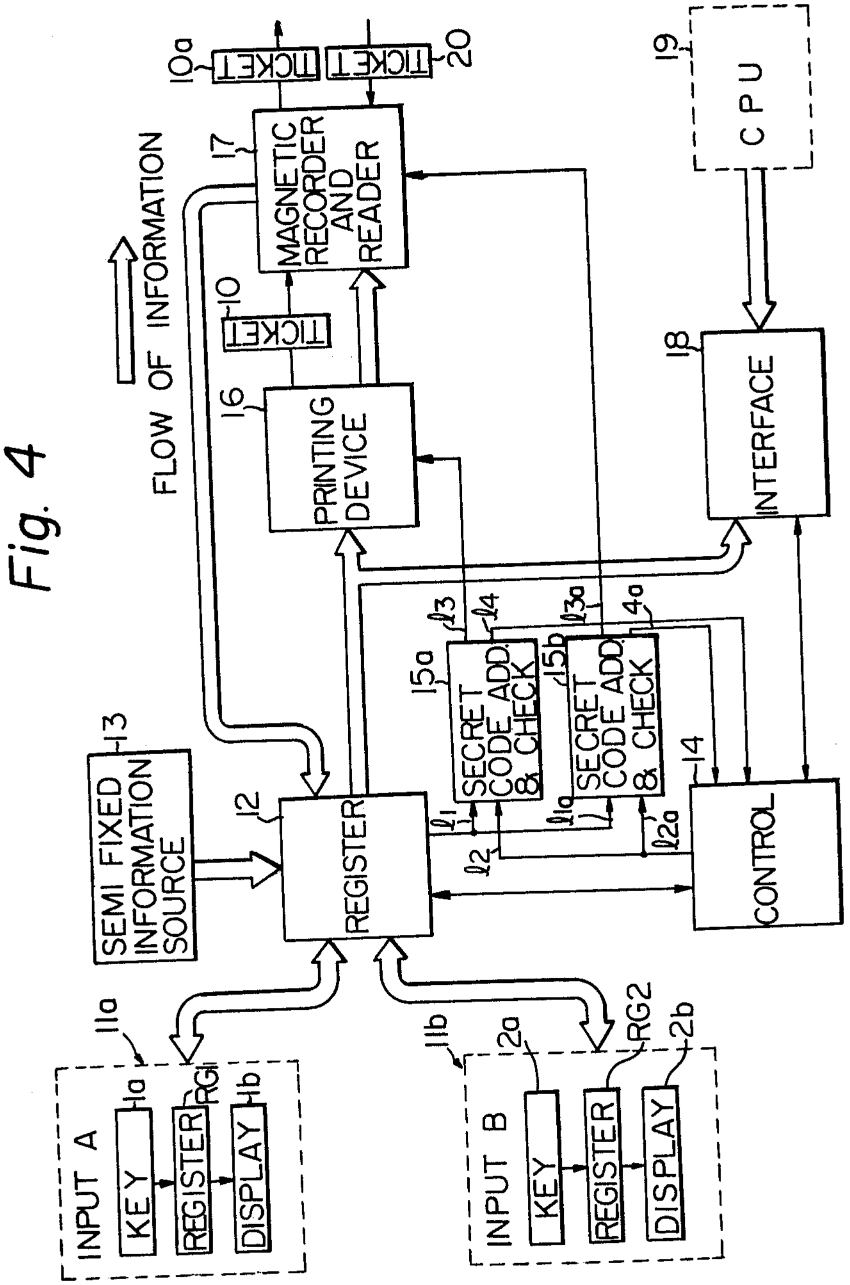
FIG. 4 shows the electronic block diagram of the apparatus shown in FIG. 2.

Next, we will explain the operation of the processing apparatus operating during the period of the printing of betting tickets, and the operation of the addition of secret codes, by referring to FIGS. 3 and 4. When the operator receives betting information from the spectator, he operates a group of keys 3*a*, 3*b*, 3*c*, 3*d*, 3*e* and 3*f* according to said received betting information. For example, when the operator receives the betting information as shown in FIG. 1, he first operates the betting key 31 of the key group 3*a* so as to set the apparatus to a betting mode. Next, after pushing the race number input key 3*f*, he pushes the key "1" of the ten-key 3*c* twice for inputting the race number. Then, he pushes the push button "F" for the key group "3*b*" and the push buttons "4", "6"; "2", "0", "0", "0", in that order. Referring to FIG. 4, this information is successively written in a register $RG_1$ of the input device 11*a*, and the indications "11", "F", "4-6", "2000 Yen" are then displayed on the display panel 1*b* of the input device 11*a*. When the operator receives one item of the betting information, he pushes the set key 3*d* to send a pause signal. Next, the betting information of "4-7" and of "3000 Yen" are impressed and sent to the register $RG_1$ by operating the ten-key 3*c*, and displayed on the display panel in a similar manner. When the last item of the betting information is keyed in, the operator pushes the transmission key 3*e* for sending the output signal which indicates the end of the betting information to be printed on one betting ticket.

The betting information stored in the register $RG_1$ of the input device 11*a* is transferred to the register 12 of the main body 3, shown in FIG. 2, for storage therein. The semi-fixed information such as "Time", "Name of the race course", "Date", and "Year" is supplied from the semi-fixed information source 13 to the register 12. When the transmission key 3*e* is pushed, the content of the register 12 is sent, under the control of the transmission control device 14, via the interface 18, to the computer CPU 19 and then stored therein. This stored information is used for calculating the dividends of the race. The computer calculates the total amount and sends the information concerning said amount to the terminal side, and the value of said amount is stored in the register 12. The information of said amount is also sent to the register $RG_1$ and is displayed on the display panel SD (shown in FIG. 3). At the same time, two kinds of secret code operators are sent from the computer via the interface 18 and the control device 14 to the secret code adding checking circuits 15*a* and 15*b*, respectively. On the other hand, betting information is being supplied from the register 12 to the secret code adding checking circuits 15*a* and 15*b*. Therefore, said circuits 15*a* and 15*b* operate logically according to the secret code operators sent from the computer CPU to form two different kinds of secret codes. One secret code is used for effecting a code in the visible form, and said code is formed by a figure code having a predetermined number of digits. The other secret code is used for effecting a code in the magnetically readable form, and said code is formed by a bit code having a predetermined number of digits. The former code is the output of the first secret code adding checking circuit 15*a*. Said output controls a printing device 16 so as to add a secret code in the visible form to the betting ticket. The latter code is the output of the second secret code adding checking circuit 15*b*, and said output controls the magnetic recorder and reader device 17 for adding a secret code in the magnetically readable form to the betting ticket.

In the printing device 16, the betting information and semi-fixed information from the register 12 are printed on the betting tickets, and the secret code in the visible form is added to the information from the first secret code adding/checking circuit 15*a*. Subsequently, the betting ticket printed with this information and with the secret code is sent to the magnetic recorder and reader device 17 where the magnetically readable secret code is added onto the magnetic recording region on the reverse side of the betting ticket, and thus the ticket 10*a* complete with the necessary information is ready for issuing to the spectator. The operations of the processing apparatus according to the present invention for printing the betting ticket are described hereinabove.

Next, we will explain the operation for verifying the secret codes during the period of the payment of the dividends. After the race is over and the gained dividends have been paid, the operator operates the payment key 33 (FIG. 3) on the keyboard *1a* and inserts the betting ticket 20 (FIG. 4) into the insertion openings 8 or 9 shown in FIG. 2. When the betting ticket reaches the magnetic recorder and reader device 17 (FIG. 4), said device 17 reads the secret code recorded on the magnetic recording region of the betting ticket and said secret code thus read is supplied to the second secret code adding/checking circuit 15*b* via register 12. At the same time, the secret code in the visible form (figure) recorded on the surface of the betting ticket is manually inputted by means of the input devices 11*a*, 11*b*, and said secret code in the visible form is supplied via the register 12 to the first secret code adding/checking circuit 15*a*. On the other hand, the betting information read by the magnetic reader 17 or impressed manually is supplied, via the register 12 to the secret code adding/checking circuits 15*a* and 15*b*, while at the same time said information is supplied via the interface 18 to the computer 19. The computer sends back the amount of the dividends to the register 12 and two kinds of secret code operators corresponding to the input betting information to the secret code adding/checking circuits 15*a*, 15*b*, respectively, via the interface 18 and the control device 14. When said two secret code operators are inputted to the secret code adding/checking circuits 15*a*, 15*b*, said circuits 15*a* and 15*b* form the secret code on the basis of the betting information which is supplied from the register 12, so that the secret code in the visible form and the secret code in the magnetically readable form are formed therein. Next, said circuits 15*a* and 15*b* respectively compare said secret code with the secret code impressed manually and read from the betting ticket, and when the former secret code coincides with the latter secret code, said betting ticket is recognized as an authentic one. Consequently, the amounts of the dividends calculated by the computer 19 are displayed on the input devices 11*a* and 11*b* before said amounts are paid to the betting clients.

Figure 5:
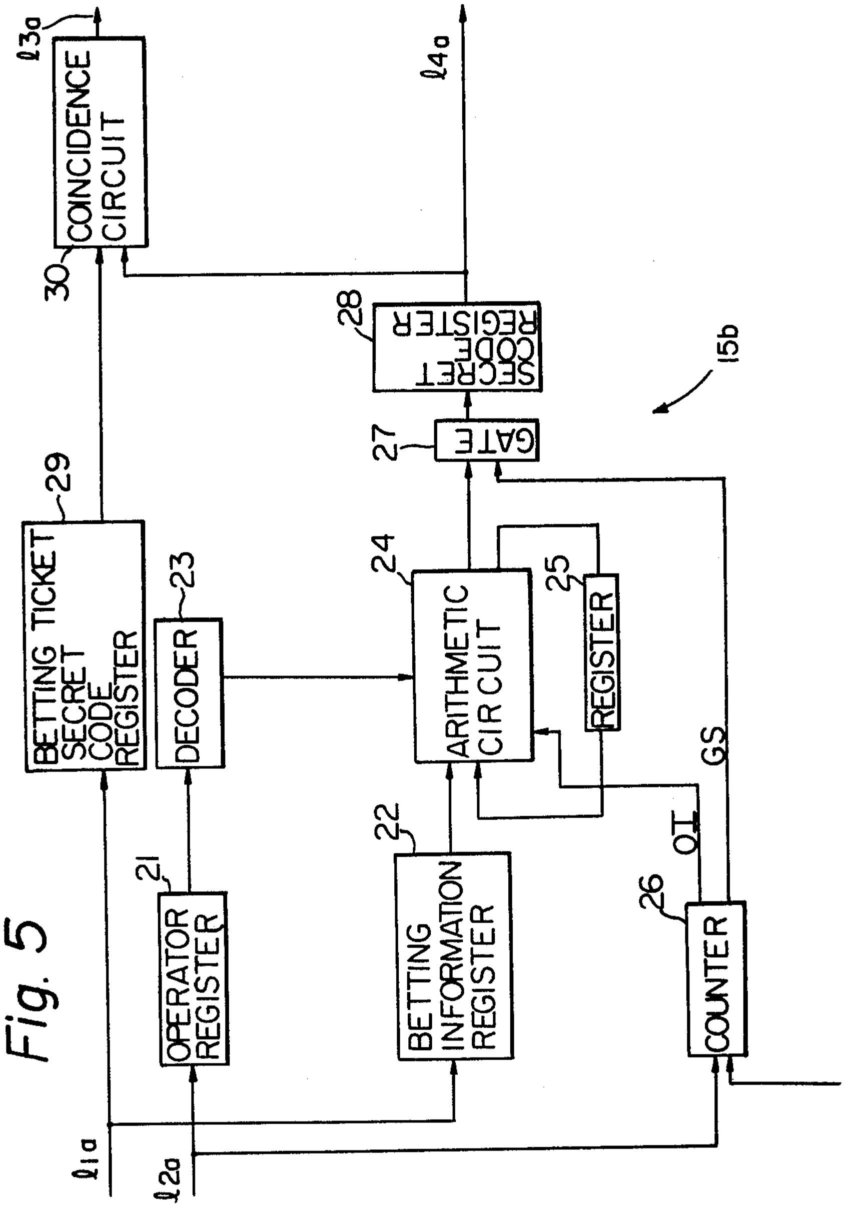
FIG. 5 shows the electronic block diagram for creating a secret code and for verifying whether the secret code on the ticket is authentic or not.

FIG. 5 shows the circuit 15*b* in detail. Since circuit 15*a* has the same construction as that of circuit 15*b*, we therefore omitted the explanation of said circuit 15*a*. As shown in FIG. 5, the circuit 15*b* is composed of a secret code operator register 21 which stores the secret code operator 12a sent from the computer 19 (FIG. 4); a betting information register 22 which stores the betting information 11a received from the magnetic recorder and reader 17 (FIG. 4); a decoder 23 which decodes the content of the secret code operator register 21 and commands one of the operations of addition, subtraction, logical product, etc.; an arithmetic circuit 24 which, based on the command from the decoder 23, forms the secret code by performing one of the above operations with respect to the betting information stored in the betting information register 22; a register 25 which stores the result of said operation; a counter 26 which is preset to the number of times of operation by the command of the computer and wherein the content of the counter is subtracted by "−1" per every one operation; a gate circuit 27 which opens so as to pass the result of the operation when the content of the counter becomes "1"; a secret code register 28 which stores the final result of the operation, that is, the secret code; a betting ticket secret code register 29 which stores a secret code 11a magnetically recorded on the betting ticket; and a coincidence circuit 30 which detects whether the contents of the register 28 and the register 29 coincide or not.

First, we will explain the operation of formulating the secret code which is added to the multi-betting ticket before said ticket is sold. The central computer stores a program for determining the secret code operator. For example, the program sums up the total number of items of the betting information received by the computer, divides said sum by three, and selects a secret code operator from the addition operator, the subtraction operator or the logical product operator, in accordance with whether the remainder of the above division is 0, 1 or 2. The above-mentioned addition operator adds all of the betting information on the betting ticket including the race number, the betting number and the total sum. The above subtraction operator successively subtracts the next betting information from the betting information in the first column. The above logical product operator operates the logical product command "and" for all the betting information.

Thus when the betting information is supplied from the input device 11*a*, 11*b* to the computer, said computer immediately determines the secret code operator in accordance with this betting information and supplies the secret code operator to the secret code operator register 21. Said secret code operator is decoded by the decoder 23, and when the decoded operator indicates the addition operator, said addition command is supplied to the arithmetic circuit 24.

At the same time when the computer is transferring said addition operator to the secret code operator register 21, said computer sets the number of times of the operation, that is, a value equal to the betting number - 1, to the counter 26. As the betting information is being supplied to the betting information register 22, the contents of said betting information are added in the arithmetic circuit 24. That is, at first, the first betting information and the second betting information are added together, and the result of said adding operation is stored in the register 25, while at the same time the content of the counter 26 is subtracted by one. Next, the result of said adding operation and the third betting information are added together, while the content of the counter 26 is further subtracted by one. These operations are carried out in the same manner until the content of the counter 26 becomes 1 and until the gate signal GS is generated so as to open the gate circuit 27.

Finally, the results of the register 25 and the final betting information are added, and the result of said final adding operation is sent via the gate circuit 27 to be stored in the secret code register 28. At the same time when the content of the counter 26 becomes zero, the operation inhibit signal OI is supplied from the counter 26 to the arithmetic circuit 24 so as to complete the operation of formulating the secret code. As already mentioned, the secret code is supplied via a line 14*a* to the magnetic recorder and reader 17 and recorded on the magnetic recording region of the betting ticket.

Next, we will explain the operation for verifying the secret code during repayment on the betting ticket.

After the operation of the repayment key 33 shown in FIG. 3, the operator inserts the multi-betting ticket into the ticket insertion openings 8 or 9 as shown in FIG. 2. After the betting ticket has been inserted, the magnetic recorder and reader 17 of the betting ticket processor reads the betting information and the secret code recorded on the reverse side of said betting ticket. Subsequently, the betting information is stored in the betting information register 22, and the secret code is stored in the betting ticket secret code register 29.

At the same time, all of the betting information is sent to the computer. Hereinafter, according to a similar process of printing the betting ticket, the secret code is first derived based on the betting information read by the magnetic recorder and reader 17 and then said secret code is stored in the secret code register 28. The coincidence circuit 30 compares the code stored in the betting ticket secret code register 29 and that stored in the secret code register 28. When said two codes coincide, then said coincidence circuit 30 sends, via the line 13*a*, a coincident signal to the control circuit 14 via the line 13*a* to inform that the betting ticket is authentic.

As mentioned above, according to the present invention, two secret codes are added to the betting ticket. One code has the visible form which can be seen by the eyes and the other code has the mechanical form which is read mechanically. When the dividend of the race is repaid to the spectator after the race, these secret codes are checked, to prevent falsification of the betting ticket.

The above-mentioned severe check is required for the betting ticket, such as the unit ticket or the multi-betting ticket, which carries a very high bet. However, with respect to a betting ticket which carries a small bet, it is possible to check said betting ticket by using only one of the two secret codes, either the visible secret code or the mechanically readable secret code. It is also possible to construct the logic circuit so that both secret codes are checked with respect to the high cost betting ticket, and only one secret code is checked with respect to the low cost betting ticket.

In the embodiment according to the present invention, the check circuits 15*a* and 15*b* are provided for adding and checking the secret codes. However, the function of these adding/checking circuits 15*a* and 15*b* can be carried out by the computer. In this case, the computer stores the program for adding the secret code and the program for checking the secret code in advance. Such programs easily verify and add the necessary secret codes during when betting tickets are sold or when dividends are paid on winning betting tickets.

What is claimed is:

1. An apparatus for processing operator input betting information to issue a betting ticket, and for determining whether said betting ticket is authentic once a betting ticket is returned and presented for payment, said apparatus comprising, in combination:

forming means responsive to said operator input betting information for forming at least one computed secret code logically in accordance with the input betting information, recording means for recording said at least one computed secret code along with said input betting information when said betting ticket is issued, reading means for reading said recorded at least one computed secret code and said recorded input betting information when said betting ticket is returned and presented for payment, said forming means being additionally responsive to said recorded input betting information read by said reading means for forming at least one additional secret code logically in the same manner as said at least one computed secret code was formed, and comparing means for comparing said at least one computed secret code read by said reading means with corresponding said at least one additional secret code formed by said forming means in order to determine coincidence therebetween, whereby to validate the betting ticket returned and presented for payment.

2. The apparatus of claim 1, wherein said forming means forms a first computed secret code and a second computed secret code, each different from the other, with predetermined respective logics which are also each different from the other, said recording means comprising printer means for printing said first computed secret code in a visually readable form on said betting ticket, and mechanical recording means for mechanically recording said second computed secret code on said betting ticket in a mechanically readable form, said reading means comprising first means for reading said printed first computed secret code and second means for reading said mechanically recorded second computed secret code to produce respective signals representative thereof, said forming means forming a first additional secret code and a second additional secret code logically in the same manner as said first computed secret code and said second computed secret code were formed, said comparing means comparing said first and second computed secret codes with said first and second additional computed secret codes, respectively, so as to determine coincidence therebetween.

3. The apparatus of claim 1, wherein said recording means comprises:

means for printing said at least one computed secret code in a visually readable form on said betting ticket, and means for simultaneously, mechanically recording said at least one computed secret code in a mechanically readable form on said betting ticket;

said comparing means comparing said at least one computed secret code recorded in mechanically readable form with said at least one additional secret code formed by said forming means logically in the same manner as said at least one computed secret code was formed in accordance with the betting information on said betting ticket, whereby to validate said betting ticket returned and presented for payment.

4. The apparatus of claim 1, wherein said recording means comprises:

means for printing said at least one computed secret code in a visually readable form on said betting ticket, and means for simultaneously, mechanically recording said at least one computed secret code in a mechanically readable form on said betting ticket;

said comparing means comparing said at least one computed secret code recorded in a visually readable form on said ticket with said at least one additional secret code formed by said forming means logically in the same manner as said at least one computed secret code was formed in accordance with the betting information on said betting ticket, whereby to validate said betting ticket returned and presented for payment.

5. An apparatus for processing a betting ticket containing betting information to determine the authenticity thereof, wherein said betting information includes betting data recorded on said ticket at the time of issuance, and at least one compued secret code recorded on said betting ticket at the time of issuance, said at least one computed secret code having been formed by the performance of at least one given logic operation on said betting information, said apparatus comprising, in combination:

deriving means for deriving said betting data and said at least one computed secret code from said ticket, arithmetic means for performing said at least one given logic operation on said betting data to derive as an output at least one additional computed secret code, and comparing means for comparing said at least one computed secret code derived by said deriving means with said at least one additional secret code derived by said arithmetic means to determine coincidence therebetween, thereby to determine the authenticity of said betting ticket.

6. The apparatus of claim 5, wherein said at least one given logic operation comprises a plurality of selectable logic operations, each of said selectable logic operations having a corresponding designator code, said arithmetic means comprising:

means for receiving said designator code, and means for decoding said designator code in order to determine which of said plurality of selectable logic operations to perform.

7. The apparatus of claim 6, wherein one of said plurality of selectable logic operations comprises an iterative process including a plurality of logic steps to be performed, said designator code including an iteration count indicating the numer of logic steps to be performed, said arithmetic means including counting means for counting said plurality of logic steps as they are performed, and means responsive to said iteration count and to said counting means for stopping said iterative process when said number of logic steps to be performed has been completed.

* * * * *

UNITED STATES PATENT AND TRADEMARK OFFICE

CERTIFICATE OF CORRECTION

PATENT NO. : 4,108,364

DATED : August 22, 1978

INVENTOR(S) : Takehiko Tanaka et al

It is certified that error appears in the above-identified patent and that said Letters Patent are hereby corrected as shown below:

Column 5, line 51, "12a" should be --ℓ2a--.
Column 5, line 53, "11a" should be --ℓ1a--.
Column 6, line 3, "11a" should be --ℓ1a--.
Column 6, line 60, "14a" should be --ℓ4a--.
Column 7, line 17, "13a" should be --ℓ3a--.
Column 7, line 18, "13a" should be --ℓ3a--.
Column 9, line 3, "compued" should be --computed--.

Signed and Sealed this

*Thirteenth* Day of *March 1979*

[SEAL]

*Attest:*

RUTH C. MASON
*Attesting Officer*

DONALD W. BANNER
*Commissioner of Patents and Trademarks*